(12) United States Patent
Matsumoto

(10) Patent No.: US 9,967,423 B2
(45) Date of Patent: May 8, 2018

(54) IMAGE FORMING APPARATUS AND METHOD FOR CONTROLLING IMAGE FORMING APPARATUS

(71) Applicant: CANON KABUSHIKI KAISHA, Tokyo (JP)

(72) Inventor: Akihiro Matsumoto, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/439,797

(22) Filed: Feb. 22, 2017

(65) Prior Publication Data
US 2017/0257513 A1 Sep. 7, 2017

(30) Foreign Application Priority Data

Mar. 4, 2016 (JP) .................................. 2016-042307

(51) Int. Cl.
*H04N 1/21* (2006.01)
*H04N 1/41* (2006.01)
*H04N 1/32* (2006.01)
*G06F 3/06* (2006.01)
*G06F 12/02* (2006.01)

(52) U.S. Cl.
CPC ............. *H04N 1/21* (2013.01); *G06F 3/0608* (2013.01); *G06F 3/0655* (2013.01); *G06F 3/0679* (2013.01); *G06F 12/0238* (2013.01); *H04N 1/32358* (2013.01); *H04N 1/41* (2013.01); *G06F 2212/401* (2013.01); *G06F 2212/7201* (2013.01); *H04N 2201/0094* (2013.01)

(58) Field of Classification Search
CPC ............................... H04N 1/21; G06F 3/0608
See application file for complete search history.

(56) References Cited

U.S. PATENT DOCUMENTS

2006/0069861 A1* 3/2006 Amano ............... G06F 11/1458
711/114
2010/0325356 A1* 12/2010 Ash ..................... G06F 12/0804
711/113

FOREIGN PATENT DOCUMENTS

JP 201214632 A 1/2012
JP 2013513186 A 4/2013

* cited by examiner

*Primary Examiner* — Ibrahim Siddo
(74) *Attorney, Agent, or Firm* — Canon U.S.A., Inc. IP Division

(57) ABSTRACT

An image forming apparatus for processing print data is disclosed. The image forming apparatus includes a control unit configured to control a plurality of nonvolatile storage devices having different transfer rates, and a determination unit configured to determine a nonvolatile storage device to store print data from among the plurality of nonvolatile storage devices based on information related to a size of the print data, information related to the transfer rates of the plurality of nonvolatile storage devices, and a threshold value depending on the number of sheets to be printed and output per unit time. The control unit and the determination unit are implemented by one or more processor.

13 Claims, 18 Drawing Sheets

FIG. 4

| DEVICE NUMBER | TOTAL NUMBER OF SECTORS | MAXIMUM PHYSICAL LBA | MINIMUM LOGICAL LBA | MAXIMUM LOGICAL LBA |
|---|---|---|---|---|
| HDD | SNA | LBAr 1 | LBAm 1 | LBAn 2 |
| SSD | SNB | LBAr 2 | LBAm 1 | LBAn 2 |

| PM THRESHOLD VALUE | COMPARISON DATA SIZE |
|---|---|
| | LEVEL 1 |

| SERVICE LIFE THRESHOLD VALUE | | SSD REPLACEMENT FLAG |
|---|---|---|
| | LEVEL 2 | |

| CURRENT SERVICE LIFE VALUE |
|---|
| CUMULATIVE WRITE AMOUNT |

FIG. 7A

| | 706 | 707 | | 708 | 717 |
|---|---|---|---|---|---|
| 701 — COMMAND ENTRY NUMBER | CTBL1 | CTBL2 | ... | CTBLn | |
| 702 — LOGICAL LBA | LBA1 | LBA2 | | LBAn | |
| 703 — SECTOR COUNT | SC1 | SC2 | | SCn | |
| 704 — SATA COMMAND NUMBER | 0x35 | 0x35 | | 0x35 | |
| 705 — EOF FLAG | 0 | 0 | | 1 | |

FIG. 7B

| | 714 | 715 | | 716 | 718 |
|---|---|---|---|---|---|
| 709 — DATA ENTRY NUMBER | DTBL1 | CTBL2 | ... | CTBLn | |
| 710 — SOURCE ADDRESS | SA1 | SA2 | | SAn | |
| 711 — DESTINATION | DA1 | DA2 | | DAn | |
| 712 — BYTE COUNT | BC1 | BC2 | | BC2 | |
| 713 — EOF FLAG | 0 | 0 | | 1 | |

719

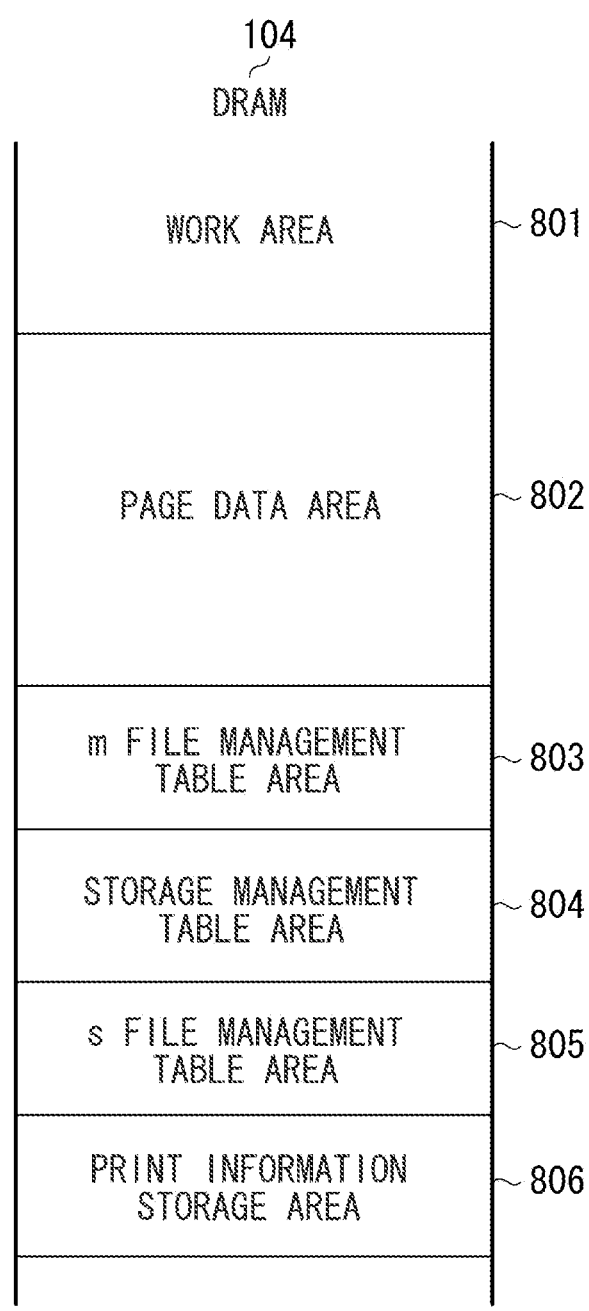

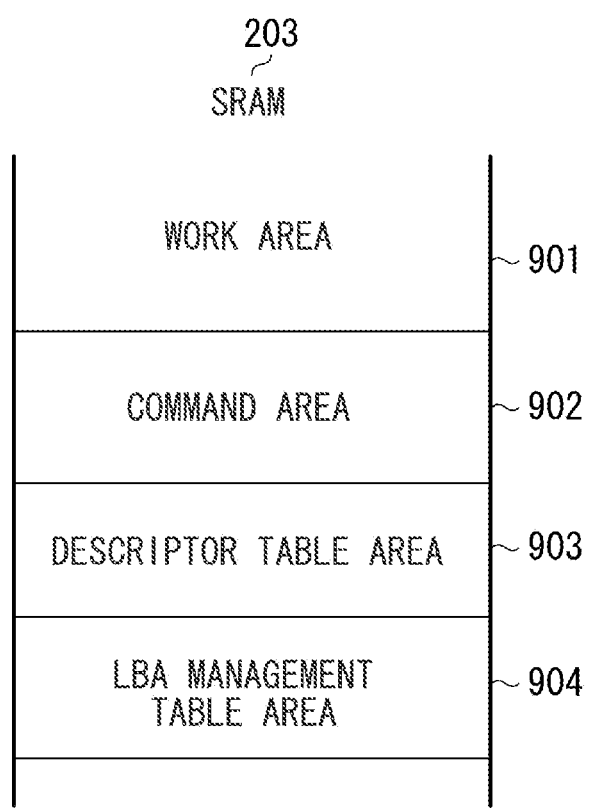

IMAGE FORMING APPARATUS AND METHOD FOR CONTROLLING IMAGE FORMING APPARATUS

BACKGROUND OF THE INVENTION

Field of the Invention

The present invention relates to an image forming apparatus and a method for controlling the image forming apparatus.

Description of the Related Art

Hard disk drives (HDDs) are nonvolatile storage devices. HDDs have advantages including a low price per bit, high capacity, and an unlimited number of rewrite cycles, but have disadvantages including intermediate-speed processing performance and vulnerability to vibrations because of their mechanical structures. In recent years, solid-state drives (SSDs) using flash memories have been rapidly spreading. SSDs are storage devices including semiconductor elements and thus are resistant to vibrations. SSDs also have an advantage of processing speed twice or more as high as that of HDDs. SSDs have however fewer rewrite cycles per block unit due to miniaturization. Multi-level cell (MLC) SSDs have a number of rewrite cycles as extremely small as approximately 1000 to 3000 cycles. Although the high-speed performance of SSDs is advantageous, the SSDs' short service life in terms of rewrite cycles is a fatal disadvantage to cache systems, database apparatuses, and printing apparatuses in which the rewriting frequency is high.

Methods for extending the service life of a storage device, such as an SSD, using flash memory have been known. Japanese Unexamined Patent Application Publication (Translation of PCT Application) No. 2013-513186 discusses a data cache system including a hybrid configuration of an SSD and an HDD. According to Japanese Unexamined Patent Application Publication (Translation of PCT Application) No. 2013-513186, a data write cache is temporarily stored in the HDD, and the cached data is transferred to the SSD according to a transfer policy in consideration of the service life of the SSD.

Japanese Patent Application Laid-Open No. 2012-14632 discusses a service life extension method in which a data table of high update frequency is generated on a long service life storage device (HDD) and a table data of low update frequency is generated on a flash memory based on the update frequency of data, based on the update frequency of write data, in a database apparatus.

However, the methods discussed in Japanese Unexamined Patent Application Publication (Translation of PCT Application) No. 2013-513186 and Japanese Patent Application Laid-Open No. 2012-14632 are difficult to apply to high-end printing apparatuses which need to realize both high resolution and high-speed printing. The method discussed in Japanese Unexamined Patent Application Publication (Translation of PCT Application) No. 2013-513186 is not able to satisfy an output page per minute (PPM) specification of the printing apparatuses because of the processing performance of the HDD. The method discussed in Japanese Patent Application Laid-Open No. 2012-14632 is difficult to apply to a printing apparatus, from the viewpoint of statistic values such as update frequency.

SUMMARY OF THE INVENTION

According to an aspect of the present invention, an image forming apparatus for processing print data includes a control unit configured to control a plurality of nonvolatile storage devices having different transfer rates, and a determination unit configured to determine a nonvolatile storage device to store print data from among the plurality of nonvolatile storage devices based on information related to a size of the print data, information related to the transfer rates of the plurality of nonvolatile storage devices, and a threshold value depending on the number of sheets to be printed and output per unit time. The control unit and the determination unit are implemented by one or more processor.

Further features of the present invention will become apparent from the following description of exemplary embodiments with reference to the attached drawings.

BRIEF DESCRIPTION OF THE DRAWINGS

FIG. 4 is a diagram illustrating a configuration example of a storage management table.

FIGS. 7A and 7B are diagrams each illustrating a configuration example of a descriptor table.

FIG. 8 is a diagram illustrating an example of a mapping configuration on the main memory.

FIG. 9 is a diagram illustrating an example of a mapping configuration on a static random access memory (SRAM) included in the SATA control unit.

DESCRIPTION OF THE EMBODIMENTS

Figure 1:
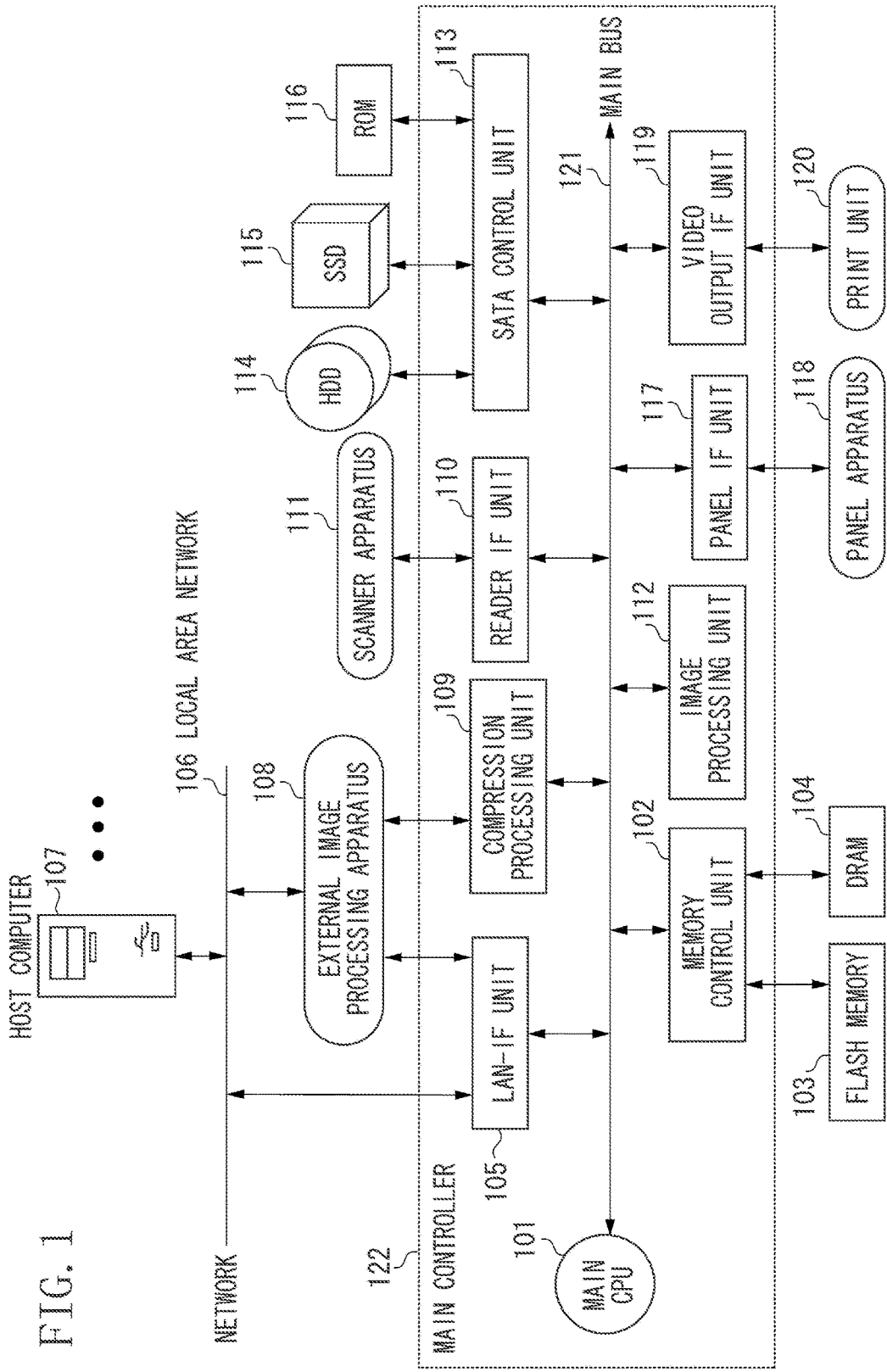
FIG. 1 is a diagram illustrating a configuration example of a printing system.

FIG. 1 is a diagram illustrating a configuration example of a printing system according to a first exemplary embodiment of the present invention. The printing system includes a printing apparatus, a local area network 106, and a host computer 107. The printing apparatus includes a main controller 122, an external image processing apparatus 108, a scanner apparatus 111, a hard disk drive (HDD) 114, a solid-state drive (SSD) 115, a read-only memory (ROM)

116, a flash memory 103, a dynamic random access memory (DRAM) 104, a panel apparatus 118, and a print unit 120. The HDD 114 is a nonvolatile storage device. The SSD 115 is a nonvolatile storage device with flash memory. The SSD 115 has a write speed and a read speed higher than those of the HDD 114. In other words, the HDD 114 and the SSD 115 have different write speeds and read speeds. The main controller 122 includes a main central processing unit (CPU) 101, a memory control unit 102, a local area network interface (LAN-IF) unit 105, a compression processing unit 109, a reader interface (IF) unit 110, an image processing unit 112, a Serial Advanced Technology Attachment (SATA) control unit 113, a panel IF unit 117, and a video output IF unit 119. The main controller 122 further includes a main bus 121.

The main CPU 101 is a control unit, and performs system control and various types of arithmetic processing. The memory control unit 102 performs input/output control and direct memory access (DMA) control on various memory devices including the flash memory 103 and the DRAM 104. The flash memory 103 is rewritable nonvolatile memory, and stores a control program and control parameters of the entire system. The DRAM 104 is a volatile memory dedicated to rewriting, typified by a double data rate (DDR) memory. The DRAM 104 is used as a work area of a program, a storage area of print data, and a storage area of various types of table information. The relationship here between the memory control unit 102 and the various memory devices is a simplified representation, and the memory devices are independently controlled. The LAN-IF unit 105 is an interface unit for the local area network 106. The LAN-IF unit 105 supports, for example, the Transmission Control Protocol/Internet Protocol (TCP/IP). The printing apparatus is connected to network-compatible apparatuses, such as the external host computer 107, via the local area network 106 and can perform printing.

The external image processing apparatus 108 performs various types of image processing on print data received via the local area network 106, and transmits image data to the compression processing unit 109. The external image processing apparatus 108 is connected to the LAN-IF unit 105 on a one-to-one basis, and transmits and receives print information and a status. The compression processing unit 109 compresses the image data from the external image processing apparatus 108 and stores the compressed data into a predetermined location in the DRAM 104 via the memory control unit 102. Examples of the compression method include lossless compression and Joint Photographic Experts Group (JPEG) compression. The reader IF unit 110 is an interface unit for performing communication control on the scanner apparatus 111. The scanner apparatus 111 generates image data by scanning. The main controller 122 causes the print unit 120 to print the image data scanned by the scanner apparatus 111 to implement a copy function. The image processing unit 112 performs various types of image processing on the image data input via the LAN-IF unit 105 or the reader IF unit 110.

The SATA control unit 113 performs data input/output control with devices having an interface compliant with the SATA standard. The SATA control unit 113 is connected with the HDD 114 and the SSD 115, which are nonvolatile storage devices. The ROM 116 stores various parameters and a control program of a first sub CPU 201 (FIG. 2) included in the SATA control unit 113. When the printing apparatus is activated, the first sub CPU 201 performs boot processing for activation according to the program of the ROM 116 independently of the main CPU 101. The internal configuration of the SATA control unit 113 will be described below with reference to FIG. 2. The panel IF unit 117 performs communication control on the panel apparatus 118. The panel apparatus 118 serves as a user interface (UI). A user can set various settings and check a state of the printing apparatus by operating a liquid crystal screen display and buttons on the panel of the panel apparatus 118. The video output IF unit 119 performs command/status communication control on, and transfers print data to, the print unit 120. The print unit 120 includes a print unit main body, a sheet feed system, and a sheet discharge system. The print unit 120 prints the print data on paper mainly according to command information from the video output IF unit 119. The main bus 121 includes a bus controller, a control bus, and a data bus, and a local bus between certain blocks. The main bus 121 includes a Peripheral Component Interconnect Express (PCIe) bus and an internal bus of an application specific integrated circuit (ASIC).

The compressed data compressed by the compression processing unit 109 is written to the HDD 114 or the SSD 115. The compression processing unit 109 also decompresses the compression data written to the HDD 114 or the SSD 115. The print unit 120 prints the image data decompressed by the compression processing unit 109.

Figure 2:
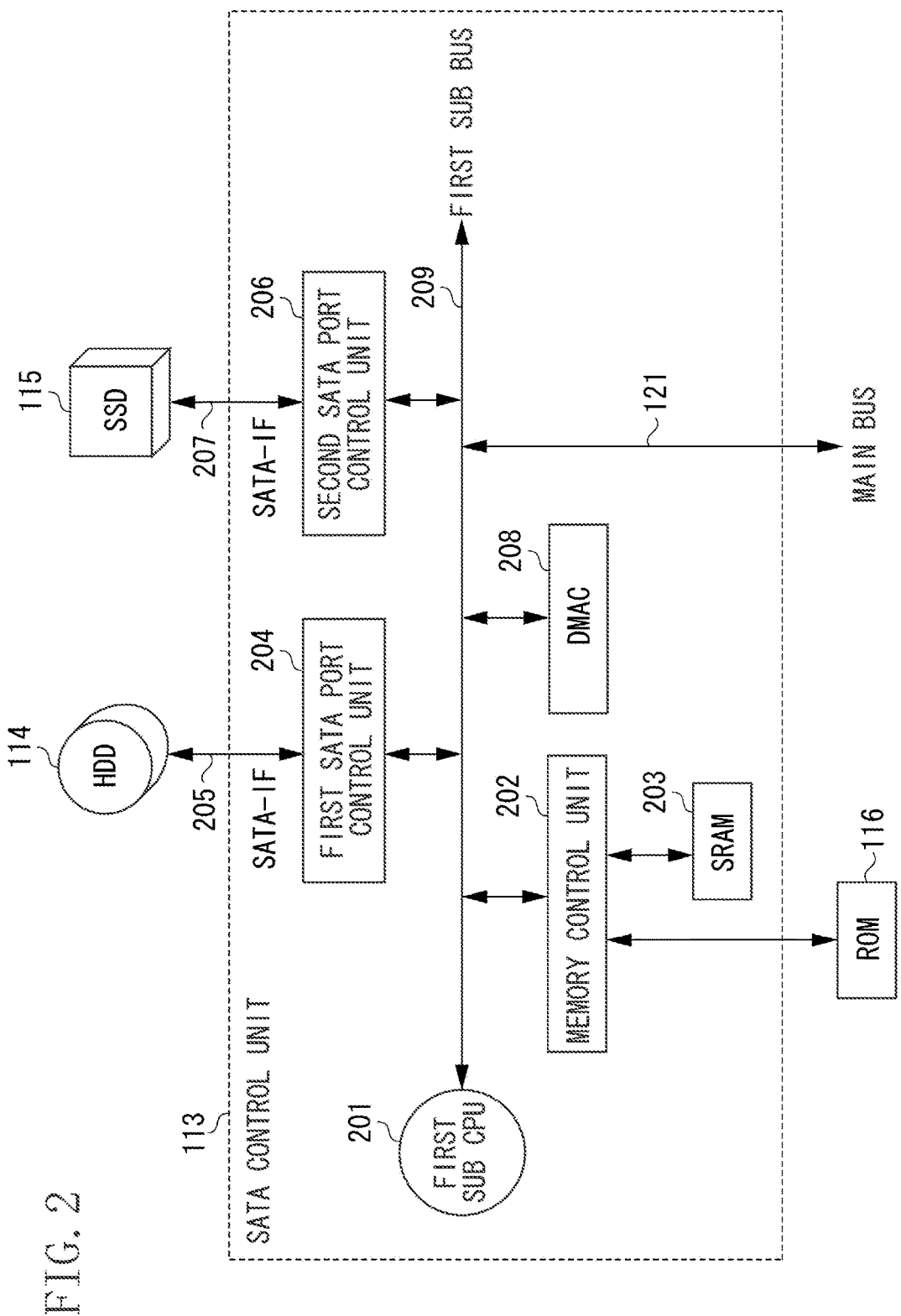
FIG. 2 is a diagram illustrating a configuration example of a Serial Advanced Technology Attachment (SATA) control unit.

FIG. 2 is a diagram illustrating an internal configuration example of the SATA control unit 113. The SATA control unit 113 includes the first sub CPU 201, a memory control unit 202, a static random access memory (SRAM) 203, a first SATA port control unit 204, a second SATA port control unit 206, a direct memory access controller (DMAC) 208, and a first sub bus 209. The first sub CPU 201 is a SATA controller. The first sub CPU 201 is a control unit for performing overall control, including SATA command issue processing, transfer processing for transmission and reception data, SATA status reception processing, and various types of calculation processing. The memory control unit 202 performs input/output control on the ROM 116 and the SRAM 203, and interrupt processing on the first sub CPU 201. The SRAM 203 includes a work area of the first sub CPU 201, various control tables, a parameter storage area, and a data buffer. The memory control unit 202 and the SRAM 203 each independently control a one-port RAM, a two-port RAM, and/or a first-in first-out (FIFO) memory. The memory control unit 202 and the SRAM 203 may include a plurality of such memories.

The SATA port control units 204 and 206 include the SATA link layer and physical layer. The first sub CPU 201 sets various SATA registers of the SATA port control units 204 and 206. According to the settings of the various SATA registers, the SATA port control units 204 and 206 issue physical (electrical signal) commands to and receive statuses of the SATA standard from the HDD 114 and the SSD 115 connected to SATA-IFs 205 and 207. The HDD 114 is connected to the first SATA port control unit 204. The SSD 115 is connected to the second SATA port control unit 206. The DMAC 208 performs data transfer between predetermined memories if the first sub CPU 201 sets a start address of the transfer destination and a size into a predetermined register and instructs the DMAC 208 to start. The first sub bus 209 includes a bus controller, a control bus, a data bus, and a local bus between predetermined blocks. The first sub bus 209 is connected to the main bus 121. The main CPU 101 can read from and write to the SRAM 203 via the first sub bus 209. The DMAC 208 performs transfer processing for reading and writing data between the SRAM 203 and the DRAM 104, which is a main memory, via the main bus 121 and the first sub bus 209.

Figure 3:
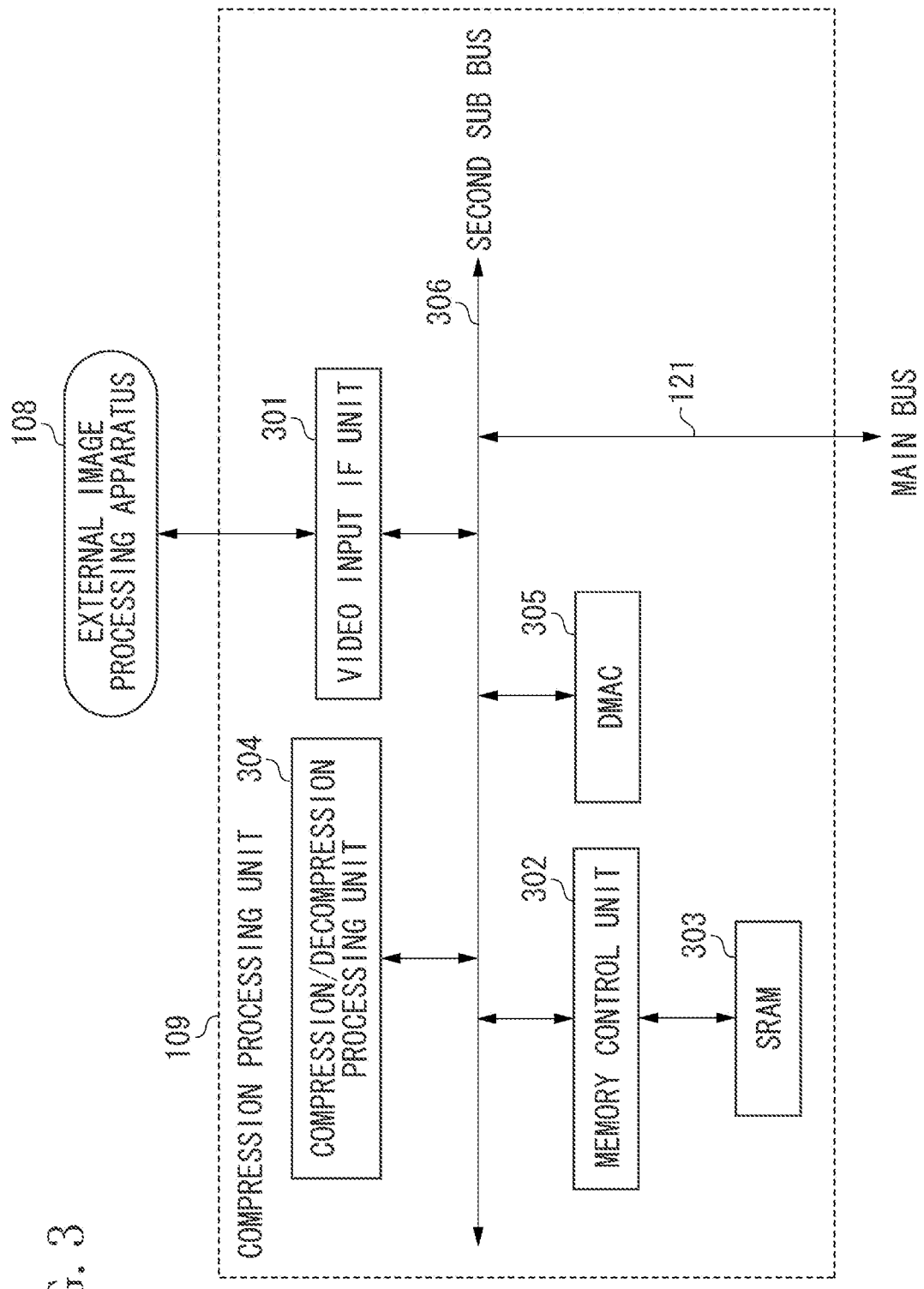
FIG. 3 is a diagram illustrating a configuration example of a compression processing unit.

FIG. 3 is a diagram illustrating an internal configuration example of the compression processing unit 109. The compression processing unit 109 includes a video input IF unit 301, a memory control unit 302, an SRAM 303, a compression/decompression processing unit 304, a DMAC 305, and a second sub bus 306. The video input IF unit 301 performs input control on the image data from the external image processing apparatus 108. The memory control unit 302 performs input/output control on the SRAM 303, and inputs and outputs control signals from/to other functional modules. The SRAM 303 is used as a temporary storage area of the image data. The memory control unit 302 and the SRAM 303 independently control a one-port RAM, a two-port RAM, and/or an FIFO memory. The memory control unit 302 and SRAM 303 may include a plurality of such memories. The compression/decompression processing unit 304 performs compression and decompression processing of the image data. As described above, examples of the compression method include lossless compression and JPEG compression. The compression/decompression processing unit 304 temporarily stores the image data input from the external image processing apparatus 108 into a line buffer in the compression/decompression processing unit 304. The compression/decompression processing unit 304 sequentially compresses the image data stored in the line buffer, and stores the compressed data into a predetermined location of the SRAM 303 via the memory control unit 302. For decompression processing, the compression/decompression processing unit 304 temporarily stores the compressed data stored in the predetermined area in the SRAM 303 into the line buffer, performs the decompression processing thereon, and stores the decompressed image data into a predetermined area of the SRAM 303 again.

The DMAC 305 performs DMA control between memories. The DMAC 305 performs data transfer between predetermined memories with a transfer source address, a transfer destination address, and size information being set and an instruction to start being given. The second sub bus 306 includes a bus controller, a control bus, a data bus, and a local bus between certain blocks. The second sub bus 306 is connected to the main bus 121. The main CPU 101 can access the compression processing unit 109 via the main bus 121. For example, the main CPU 101 can set a register of and read the DMAC 305 and the compression/decompression processing unit 304. The DMAC 305 performs transfer processing for reading and writing data between the SRAM 303 and the DRAM 104, which is the main memory, via the main bus 121 and the second sub bus 306.

FIG. 4 is a diagram illustrating the storage management table 414 stored in the DRAM 104, which is the main memory. The storage management table 414 manages various types of information and determination information about the storage devices including the HDD 114 and the SSD 115. The storage management table 414 includes a logical block addressing (LBA) management table 413, a performance (PM) threshold value 408, a service life threshold value 409, and a current service life value 415. The LBA management table 413 includes a device number 401, a total number of sectors 402, a maximum physical LBA (maximum physical address) 403, a minimum logical LBA (minimum logical address) 404, and a maximum logical LBA (maximum logical address) 405. The device number 401 indicates a serial number of each storage device. In row 406, the device number 401 indicates the serial number of the HDD 114. In row 407, the device number 401 indicates the serial number of the SSD 115. For example, the total number of sectors 402 of a connected storage device is the number of sectors into which the number of blocks of the connected storage device is converted. The total number of sectors 402 of the HDD 114 is SNA. The total number of sectors 402 of the SSD 115 is SNB. The maximum physical LBA 403 of the HDD 114 is LBAr1. The maximum physical LBA 403 of the SSD 115 is LBAr2. The minimum logical LBA 404 of the HDD 114 is LBAm1 (=0 h). The minimum logical LBA 404 of the SSD 115 is LBAn1. The maximum logical LBA 405 of the HDD 114 is LBAm2. The maximum logical LBA of the SSD 115 is LBAn2. The range of logical LBAs (logical addresses) of the HDD 114 is LBAm1 (=0 h) to LBAm2. The range of logical LBAs of the SSD 115 is LBAn1 to LBAn2. The combined logical LBAs of the HDD 114 and the SSD 115 provide serial numbers of 0 h to LBAn2. FIG. 4 illustrates a case in which two storage devices, the HDD 114 and the SSD 115, are managed in rows 406 and 407. However, the number of storage devices is not limited to two. Three or more storage devices may be connected.

The remaining portion of the storage management table 414 lists parameters used for various determination conditions. The PM threshold value 408 indicates a comparison data size for selecting either the HDD 114 or the SSD 115 according to the size of compressed data to be written to the HDD 114 or the SSD 115 in predetermined units (for example, in units of pages). Assume that an average of the maximum values of write speed obtained through measurement of a plurality of HDDs 114 of the same model number is x MB/s. The processing time for one page is determined by an output page per minute (PPM) performance specification of the printing apparatus. The transfer band required of the HDD 114 can be estimated in advance from budgets of various processing times (such as image processing time, memory-to-memory transfer time, and memory-to-HDD transfer time) for one page. In other words, the data transfer capability (amount of transfer) per second can be estimated in advance. For example, to satisfy performance of 1200 dpi, A4 size, 1/12 compression, and 103 ppm, the HDD 114 needs a write speed of 192 MB/s for a data size of 56 MB for one page. In such a case, the required values are satisfied if the HDD 114 has a write speed of x=200 MB/s. The required values are not satisfied if the HDD 114 has only a write speed of x=180 MB/s. A maximum data size P of one page for the HDD 114 to satisfy a write speed of x MB/s is set as the PM threshold value 408. The main CPU 101 can determine whether the HDD 114 satisfies the required values by comparing an actual transfer data size (write data size) per page Q with the PM threshold value 408. The HDD 114 has a write speed lower than that of the SSD 115. In a case where the actual transfer data size per page Q is smaller than or equal to the PM threshold value 408, the HDD 114 is selected as the storage device to be used. On the other hand, in a case where the actual transfer data size per page Q is greater than the PM threshold value 408, the SSD 115 is selected as the storage device to be used. The PM threshold value 408 represents a boundary between the write speeds of a plurality of storage devices (HDD 114 and SSD 115). More specifically, the PM threshold value 408 is the maximum data size per page corresponding to the write speed of the HDD 114. The DRAM 104 is a threshold value storage unit for storing the PM threshold value 408.

The service life threshold value 409 is used to divide an allowable total write amount of the SSD 115 (e.g., expressed in units of terabytes (TB)) into several sections to determine a service life level. In the present exemplary embodiment, the total write amount is divided into three sections. Service life levels 1 (410) and 2 (411) are examples of the two threshold values in descending order of service life. For example, the service life level 1 (410) is a first threshold value, which represents a yellow zone of caution stage at which the user is informed of replacement of the SSD 115. The service life level 2 (411) is a second threshold value, which represents a red zone of warning stage at which the operation of the SSD 115 is completely shifted to that of the HDD 114. At the service life level 2 (411), the user is prompted to immediately replace the SSD 115. The SSD replacement flag 412 is a flag for indicating that the service life threshold value 409 has reached the service life level 2 (411). A value 0 of the SSD replacement flag 412 indicates that replacement is not needed. A value 1 of the SSD replacement flag 412 indicates that replacement is needed. If the printing apparatus performs service life determination processing upon activation and the SSD replacement flag 412 is one, the service life determination processing is skipped. A warning for SSD replacement is displayed on the UI of the panel apparatus 118 each time the printing apparatus is activated afterward.

The current service life value 415 indicates a cumulative write amount (total write amount) of the SSD 115 up to the previous power-off. The current service life value 415 and the service life threshold value 409 are compared to display a caution or warning according to the service life level on the panel apparatus 118. For example, the current total write amount can be obtained from Self-Monitoring, Analysis and Reporting Technology (S.M.A.R.T.) information about the SSD 115. The S.M.A.R.T. information is defined as a SATA standard. The current total write amount may be obtained by adding sizes of data written by each write processing.

Figure 5:
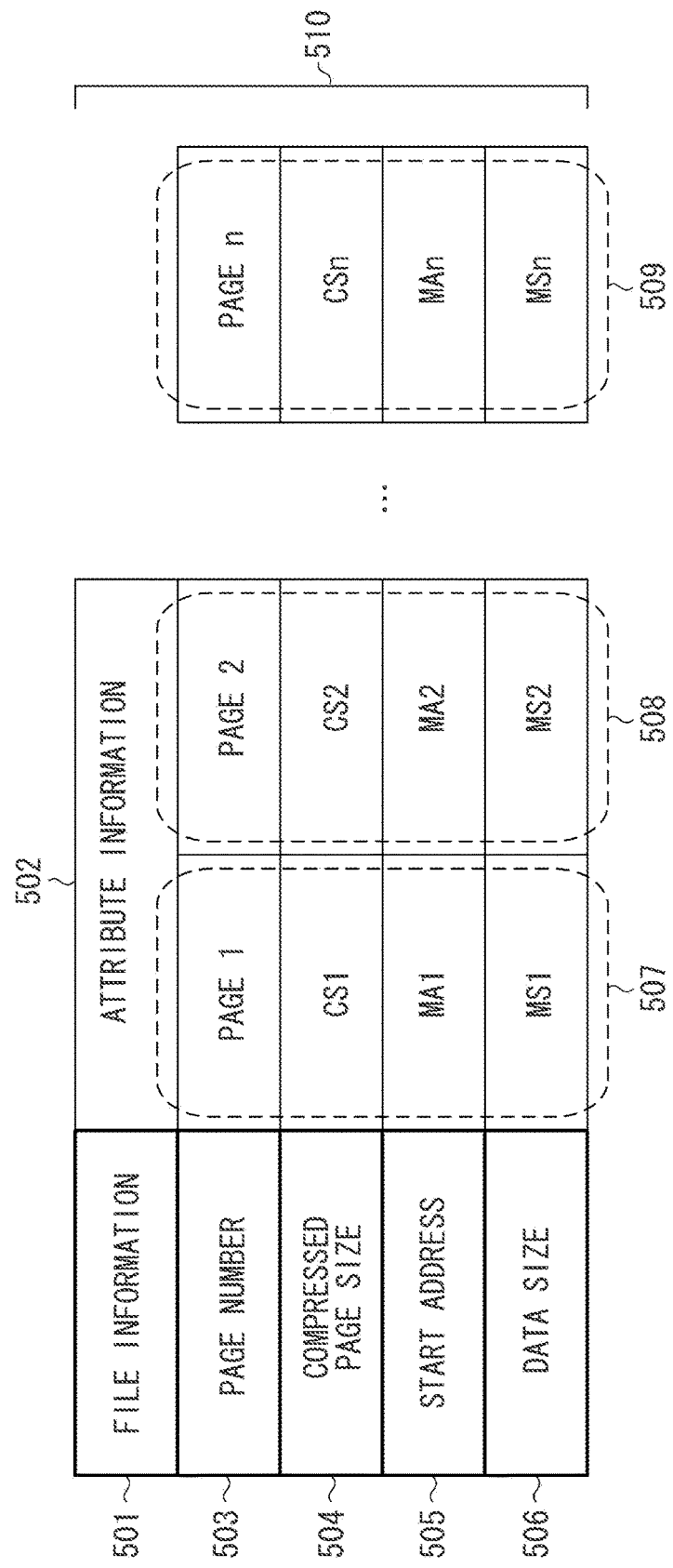
FIG. 5 is a diagram illustrating a configuration example of an m file management table on a main memory.

FIG. 5 is a diagram illustrating an m file management table 510 stored in the DRAM 104, which is the main memory. The m file management table 510 includes file information 501. The file information 501 indicates attribute information 502 about a file. The attribute information 502 includes basic information, such as a file number, a file name, a time stamp, a file size, a sheet size, and the number of pages. The m file management table 510 further includes a page number 503 indicating the number of each page, a compressed page size 504 of the compressed page, a start address 505 at which the page is recorded on the memory, and a data size 506 of a recording area starting at the start address 505. If a target page is recorded in a continuous space on the memory, the compressed page size 504 and the data size 506 have the same values. If the target page is recorded in discrete spaces, the data size 506 represents the size of the first continuous space, and then the entire target page can be accessed by using a linear list structure. The m file management table 510 lists contents of such items 503 to 506 for each of the first to last nth pages 507 to 509. FIG. 5 only illustrates entry information about a file in the m file management table 510. The m file management table 510 includes entry contents for as many as the number of files needed.

Figure 6:
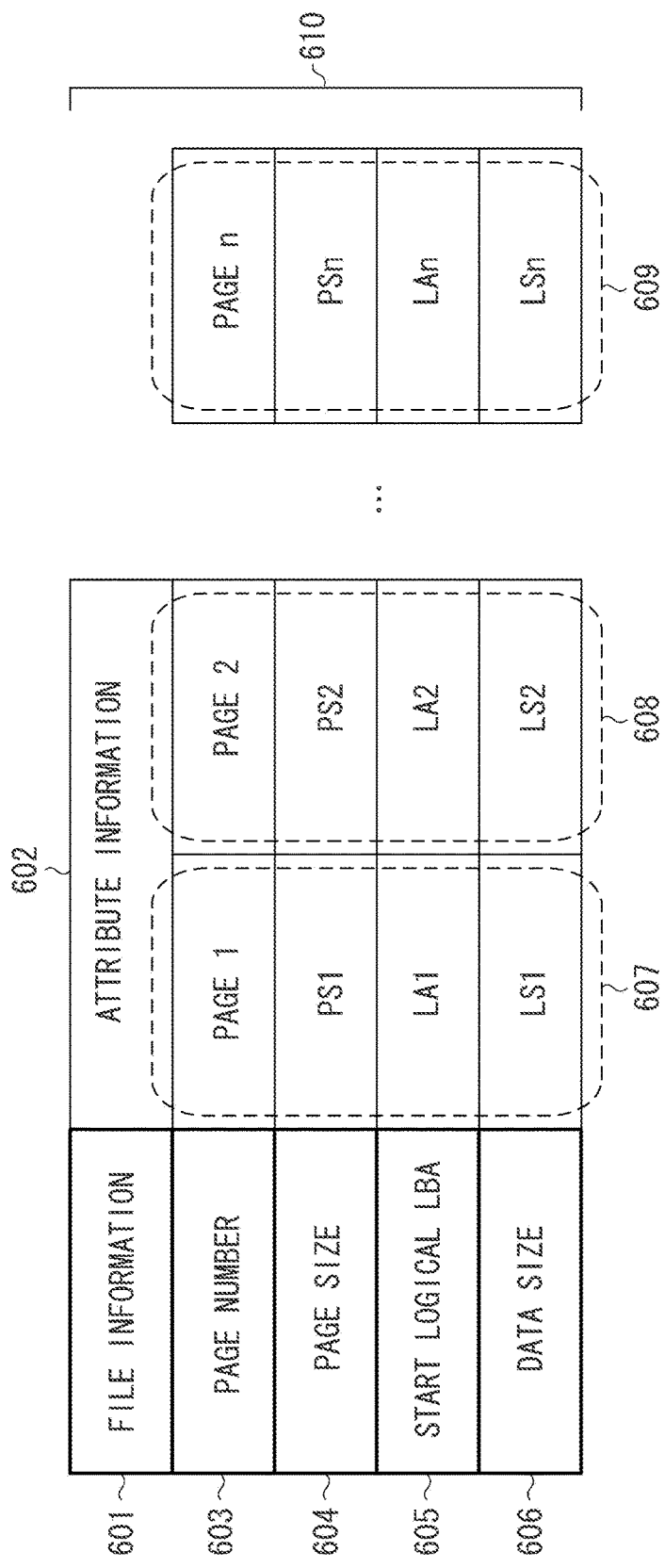
FIG. 6 is a diagram illustrating a configuration example of an s file management table on storage devices.

FIG. 6 is a diagram illustrating an s file management table 610 stored in the storage devices (HDD 114 and SSD 115). The s file management table 610 includes file information 601. The file information 601 represents attribute information 602 about a file. The attribute information 602 is basically similar to the attribute information 502 in FIG. 5. The s file management table 610 includes a page number 603 indicating the number of each page, a page size 604 indicating the size of the page, a start logical LBA (start logical address) 605 indicating a start address, and a data size 606 in units of pages. In the present exemplary embodiment, page data on the storage devices is stored in a continuous area. The s file management table 610 lists the contents of the items 603 to 606 for each of the first to last nth pages 607 to 609. FIG. 6 illustrates entry information about a single file in the s file management table 610. The s file management table 610 includes entry contents for as many as the number of files needed.

FIGS. 7A and 7B are diagrams each illustrating a configuration example of a descriptor table 719 for writing data on the DRAM (main memory) 104 to the storage devices (HDD 114 and SSD 115) in units of pages. The descriptor table 719 includes a command table 717 and a data table 718.

The command table 717 includes a command entry number 701, a logical LBA 702, a sector count 703, a SATA command number 704, and an end-of-file (EOF) flag 705. The command entry number 701 indicates an issue number of a command. The logical LBA 702 indicates a start address. The sector count 703 indicates the number of sectors. The EOF flag 705 represents the state of a final entry. The SATA command number 704 indicates a command number according to the SATA standard (0x35 is a command number for Write DMA Ext). Here, the EOF flag 705 of zero represents continuation, and one an end. The transfer processing of the target page is completed after a command is issued when the EOF flag 705 of 1 is detected. The command table 717 records the contents of the items 701 to 705 for each of the first to last nth entries 706 to 708 of a page.

The data table 718 includes a data entry number 709, a source address 710, a destination 711, a byte count 712, and an EOF flag 713. The data entry number 709 indicates a transfer processing number of data. The byte count 712 indicates the amount of transfer data in units of bytes. The EOF flag 713 represents the state of a final entry. The source address 710 indicates the start address of the transfer source of the data, stored in the DRAM (main memory) 104, which is set by the DMAC 208 (or which is set to the DMAC 208) during issuance of a write command. As with the write command, the destination 711 indicates the start address of the destination of transfer at which received data is stored in the DRAM (main memory) 104 in the case of a read command. The EOF flag 713 is similar to the EOF flag 705. In the present exemplary embodiment, transfer data from the memory corresponding to one command is assumed to be located in a continuous area. The EOF flags 705 and 713 therefore indicate an end at the same entry numbers.

FIG. 8 is a diagram illustrating a part of a memory map of the DRAM (main memory) 104. A work area 801, a page data area 802, an m file management table area 803, a storage management table area 804, and an s file management table area 805 are created on the DRAM 104 in a printable normal mode. The page data area 802 stores page data. The m file management table area 803 stores the m file management table 510. The storage management table area 804 stores the storage management table 414. The s file management table area 805 stores the s file management table 610. A print information storage area 806 is an area storing print information (attribute information needed for printing, such as a page size, the number of pages, and color information) that the main CPU 101 obtains through communication with the external image processing apparatus 108 via the LAN-IF unit 105 as described above.

FIG. 9 is a diagram illustrating a part of a memory map on the SRAM 203 included in the SATA control unit 113. A work area 901, a command area 902, a descriptor table area 903, and an LBA management table area 904 are created on the SRAM 203 in the printable normal mode. Various commands of the SATA standard are set in the command area 902. The descriptor table area 903 stores the descriptor table 719. The LBA management table area 904 stores the LBA management table 413 which is a part of the storage management table 414. Here, the command area 902 is not intended for a continuous command transfer using the descriptor table 719. Commands for a programmed input/output (PIO) transfer mode or non-data transfer mode other than the DMA transfer mode defined by the SATA standard are set in the command area 902. The command area 902 is thus used to perform a sporadic command transfer.

Here, the table areas 803 to 805 described in FIG. 8 are saved from the DRAM (main memory) 104 to the flash memory 103 in a case where the normal mode capable of immediate printing is shifted to a power saving mode or a power-off state. When the normal mode is restored, the table areas 803 to 805 are written back to the predetermined table areas 803 to 805 of the DRAM (main memory) 104 again. Similarly, the table areas 903 and 904 described in FIG. 9 are saved from the SRAM 203 to the flash memory 103 in the power saving mode or upon power-off. When the normal mode is restored, the table areas 903 and 904 are written back to the predetermined areas of the SRAM 203 again.

Figure 10:
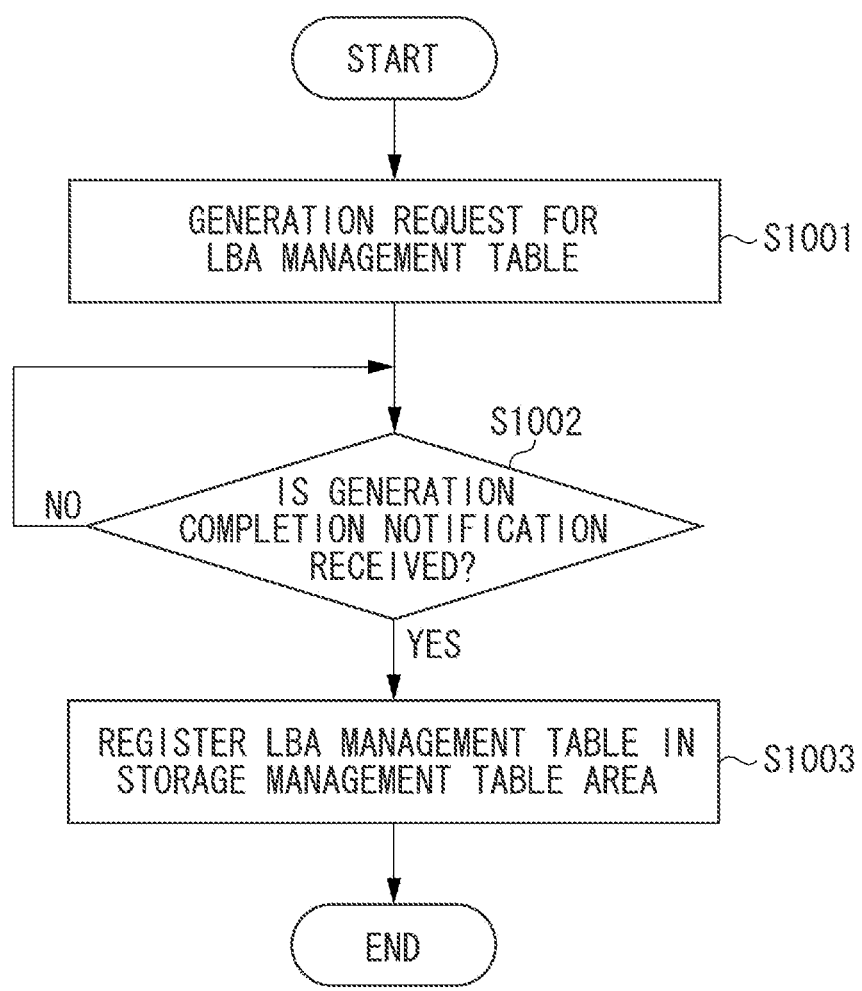
FIG. 10 is a flowchart illustrating generation processing of a logical block addressing (LBA) management table.

FIG. 10 is a flowchart illustrating a generation process of the LBA management table 413. In step S1001, the CPU 101 issues a generation request for the LBA management table 413 to the first sub CPU 201 in the SATA control unit 113. More specifically, the main CPU 101 sets a predetermined control register and issues an LBA management table generation request interrupt. In step S1002, the main CPU 101 waits for the completion of the LBA management table 413. If the LBA management table 413 is not completed (NO in step S1002), the processing remains in step S1002. If a generation completion notification is received (YES in step S1002), the processing proceeds to step S1003. The first sub CPU 201 here issues a device information acquisition command defined by the SATA standard to both the HDD 114 and the SSD 115 to be connected thereto. The first sub CPU 201 obtains, for example, a device model number and the numbers of sectors, and generates the LBA management table 413 in the LBA management table area 904 on the SRAM 203. In step S1003, the main CPU 101 obtains the LBA management table 413 from the LBA management table area 904 on the SRAM 203, and registers the LBA management table 413 into a predetermined location in the storage management table area 804 on the main memory or DRAM 104 illustrated in FIG. 8.

Figure 11:
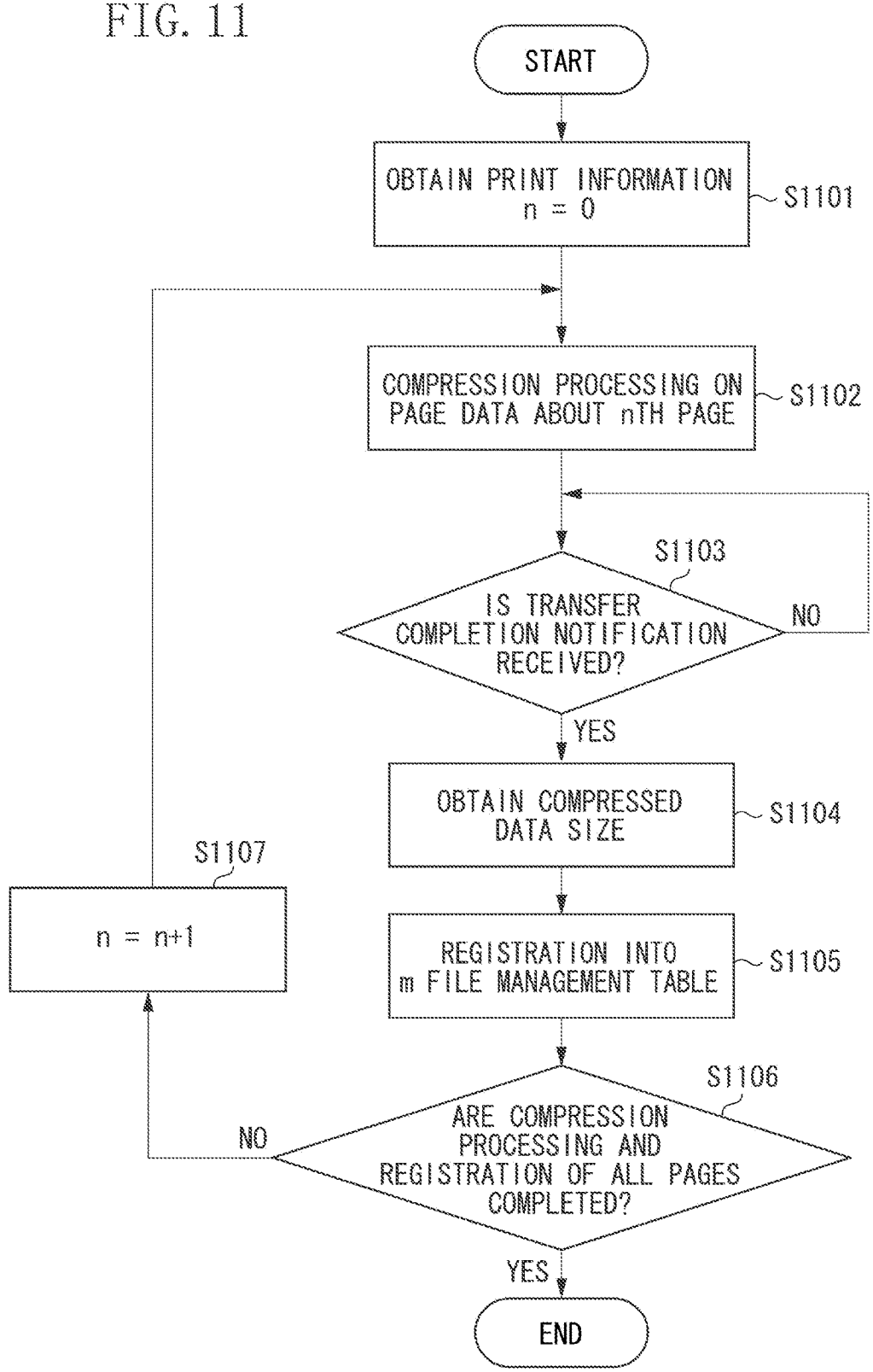
FIG. 11 is a flowchart illustrating processing for generating the m file management table on the main memory.

FIG. 11 is a flowchart illustrating compression processing of image data and generation processing of the m file management table 510. In step S1101, the main CPU 101 communicates with the external image processing apparatus 108 to obtain print information. The main CPU 101 stores the print information into the print information storage area 806 illustrated in FIG. 8. The main CPU 101 performs initialization processing for preparation of printing (sets a count value of the number of pages n=0). In step S1102, the main CPU 101 obtains page data on the nth page from the external image processing apparatus 108, performs compression processing, and stores the compressed page data into the page data area 802 illustrated in FIG. 8. Specifically, the main CPU 101 makes various settings to the compression/decompression processing unit 304, the video input IF unit 301, and the DMAC 305. The compression/decompression processing unit 304 compresses the image data received from the video input IF unit 301, and stores the compressed page data into the SRAM 303. The compression/decompression processing unit 304 sets the transfer source address and the compressed size into the DMAC 305 and instructs the DMAC 305 to start, so that the compressed data is transferred to a predetermined location in the DRAM (main memory) 104. A transfer destination address and size are set by the main CPU 101. The foregoing processing is sequentially repeated to store compressed page data for one page into a predetermined location of the page data area 802. With the completion of the compression processing for one page, the compression processing unit 109 issues a transfer completion notification to the main CPU 101.

In step S1103, if the compression processing and the transfer processing for one page are not completed (NO in step S1103), the processing remains in step S1103. If the main CPU 101 receives the transfer completion notification from the compression processing unit 109 (YES in step S1103), the processing proceeds to step S1104. In step S1104, the main CPU 101 obtains the compressed data size of the nth page from the compression/decompression processing unit 304. In step S1105, the main CPU 101 registers the page number 503, the compressed page size 504, the start address 505 of the page data stored in a specified position in the page data area 802, and the data size 506 of the nth page illustrated in FIG. 5. In step S1106, the main CPU 101 determines whether the compression processing and the registration into the m file management table 510 are completed for all the pages. If the result of determination of step S1106 is no (NO in step S1106), the processing proceeds to step S1107. In step S1107, the main CPU 101 adds 1 to a current number of page n (n=n+1). The processing returns to step S1102. If the result of determination of step S1106 is yes (YES in step S1106), the processing ends.

Figure 12:
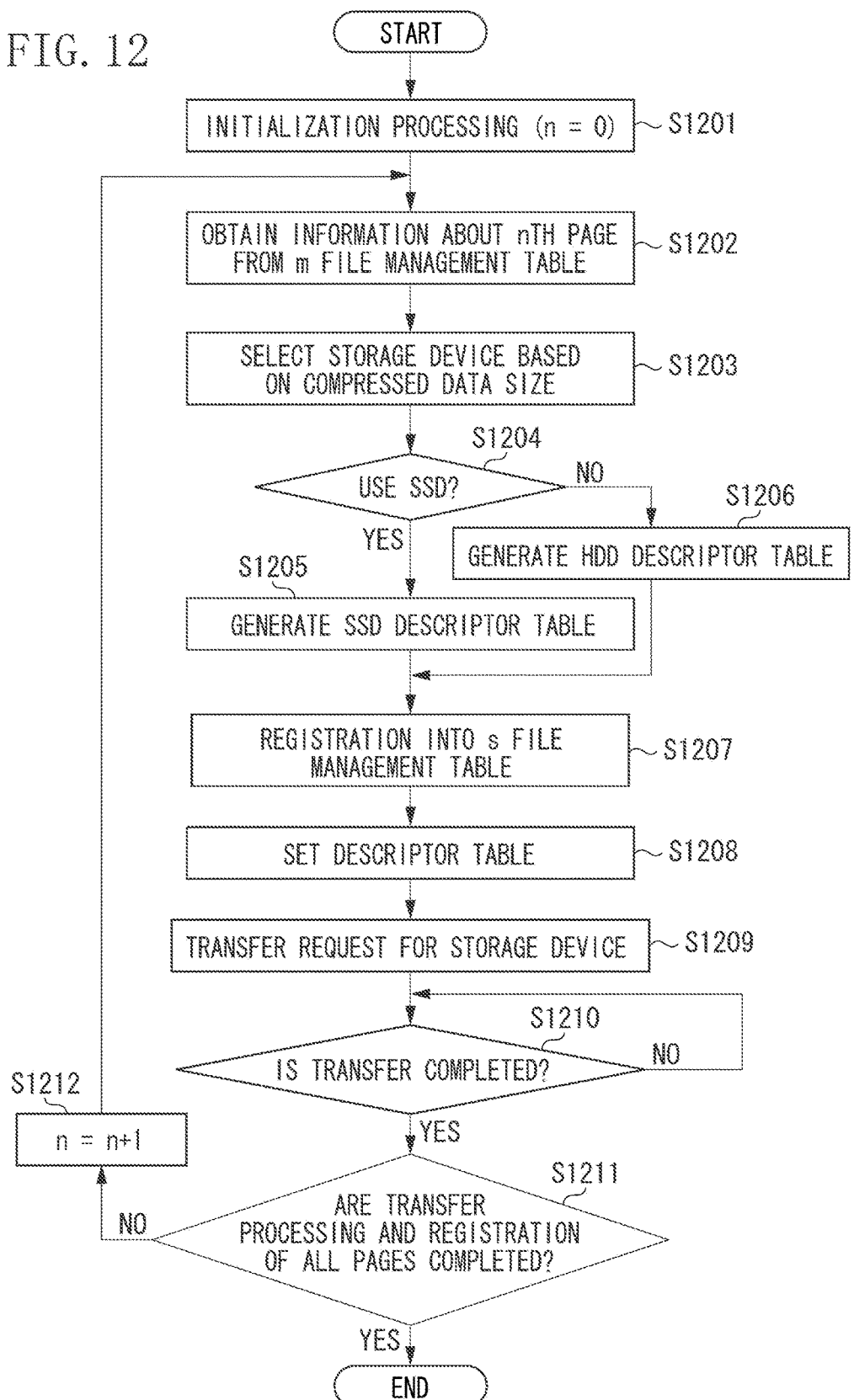
FIG. 12 is a flowchart illustrating processing for generating the s file management table on the storage devices.

FIG. 12 is a flowchart illustrating processing for generating and writing the s file management table 610 and the descriptor table 719 processed by the main CPU 101 to the storage devices. FIG. 12 illustrates a method for controlling the printing apparatus. In step S1201, the main CPU 101 performs initialization processing for the write processing of page data (sets the count value of the number of pages n=0). In step S1202, the main CPU 101 obtains information about the nth page from the m file management table 510. In step S1203, the main CPU 101 compares the compressed data size (write data size) of the obtained nth page with the PM threshold value 408 (comparison data size). The main CPU 101 then selects either the HDD 114 or the SSD 115 as a storage device to be used among the plurality of storage devices (HDD 114 and SSD 115). More specifically, in a case where the compressed data size of the nth page is smaller than or equal to the PM threshold value 408, the main CPU 101 selects the HDD 114 as the storage device to be used. In a case where the compressed data size of the nth page is greater than the PM threshold value 408, the main CPU 101 selects the SSD 115 as the storage device to be used. In step S1204, if it is determined that the SSD 115 is selected to be used as a result of the selection processing (YES in step S1204), the processing proceeds to step S1205. If it is determined that the HDD 114 is selected to be used (NO in step S1204), the processing proceeds to step S1206. In step S1205, the main CPU 101 generates an SSD descriptor table 719. The processing proceeds to step S1207. In step S1206, the main CPU 101 generates an HDD descriptor table 719. The processing proceeds to step S1207.

In step S1207, the main CPU 101 registers the management information 603 to 606 (FIG. 6) about the nth page into the s file management table 610. In step S1208, the main CPU 101 sets the descriptor table 719 generated in step S1205 or S1206 into a predetermined location in the SRAM 203 of the SATA control unit 113. More specifically, the main CPU 101 sets the descriptor table 719 into the descriptor table area 903 of the SRAM 203 described in FIG. 9. In step S1209, the main CPU 101 issues a transfer request for the storage device to the SATA control unit 113. For example, the main CPU 101 gives an instruction to start transfer by enabling a transfer interrupt signal to the SATA control unit 113. The SATA control unit 113 transfers the compressed data (write data) to the HDD 114 or the SSD 115 selected in step S1203, and the compressed data is written to the selected HDD 114 or SSD 115. In step S1210, the main CPU 101 determines whether the transfer of the nth page is completed. If the transfer is not completed (NO in step S1210), the processing remains in step S1210 to wait. If the transfer is completed (YES in step S1210), the processing proceeds to step S1211. In step S1211, the main CPU 101 determines whether the transfer processing and the registration of the s file management table 610 are completed for all the pages. If the transfer processing and the registration are not completed (NO in step S1211), the processing proceeds to step S1212. If the transfer processing and the registration are completed (YES in step S1211), the processing ends. In step S1212, the main CPU 101 adds 1 to the current number of pages (n=n+1). The processing returns to step S1202. In such a manner, the main CPU 101 compares the size of the compressed data of each page with the PM threshold value 408 to perform the selection of step S1203. In the present exemplary embodiment, the storage devices are described to be selected based on the compressed data size. However, this is not restrictive. For example, the present exemplary embodiment may be applied to a case of selecting a storage device based on raw data size.

Figure 13:
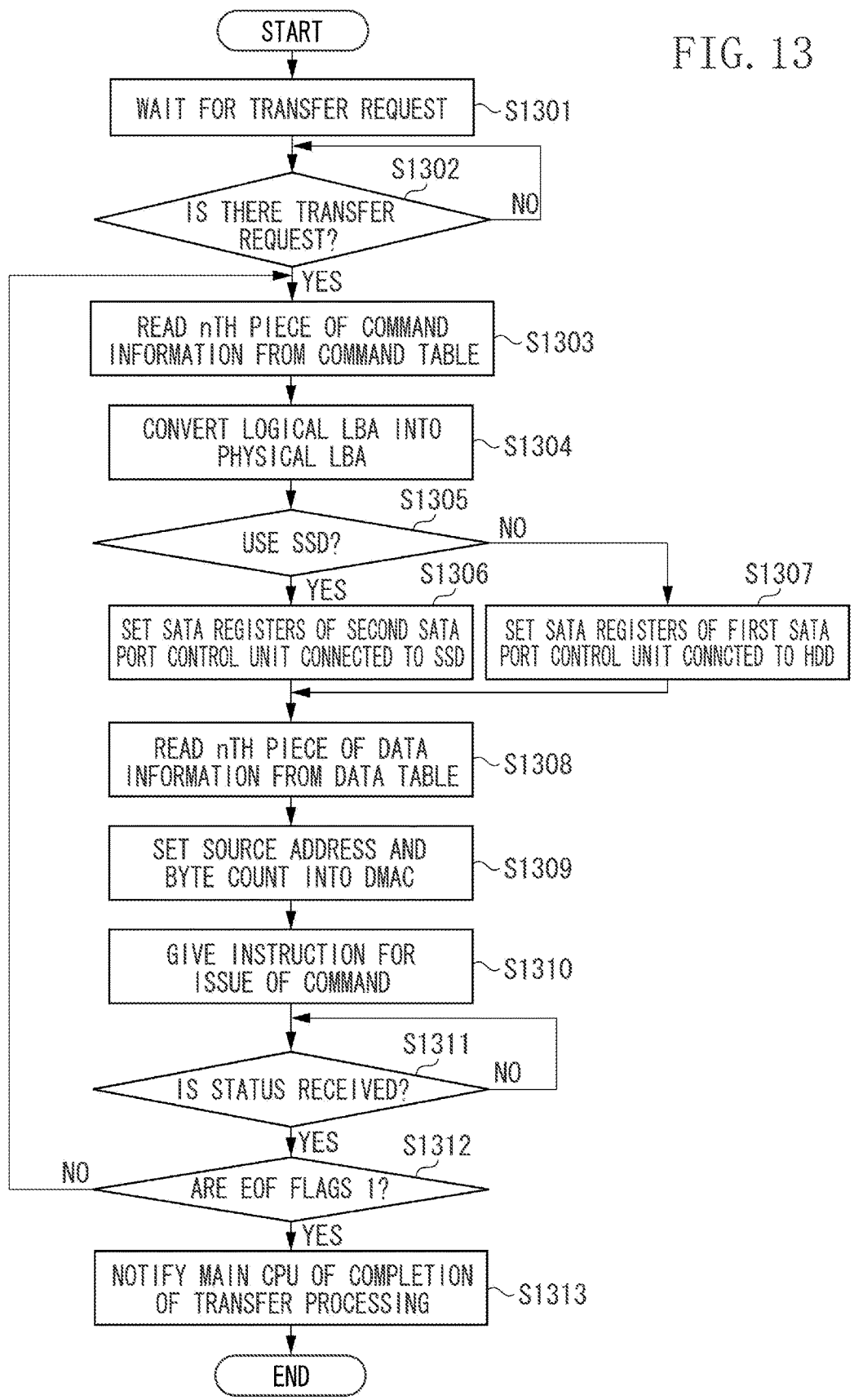
FIG. 13 is a flowchart illustrating data transfer processing with the descriptor table.

FIG. 13 is a diagram illustrating processing in which the first sub CPU 201 transfers data to the storage devices by using the descriptor table 719 in response to a transfer request given from the main CPU 101 to the SATA control unit 113. In step S1301, the first sub CPU 201 completes initialization processing for activation, and waits for a transfer request from the main CPU 101. In step S1302, the first sub CPU 201 determines whether there is a transfer request. If there is no transfer request (NO in step S1302), the processing remains in step S1302. If there is a transfer request (YES in step S1302), the processing proceeds to step S1303. In step S1303, the first sub CPU 201 reads the nth piece of command information from the command table 717 in the descriptor table 719. In step S1304, the first sub CPU 201 converts the nth logical LBA (logical address) into a physical LBA (physical address). In step S1304, the first sub CPU 201 can use the LBA management table 413 stored in the table area 904 illustrated in FIG. 9 to convert the logical LBA into the physical LBA and specify which of the storage devices the logical LBA designates, the HDD 114 or the SSD 115.

In step S1305, the first sub CPU 201 determines which of the storage devices the logical LBA designates, the HDD 114 or the SSD 115. If the SSD 115 is to be used (YES in step S1305), the processing proceeds to step S1306. If the HDD 114 is to be used (NO in step S1305), the processing proceeds to step S1307. In other words, the first sub CPU 201 specifies one of the plurality of storage devices (HDD 114 and SSD 115) based on the logical LBA. In step S1306, the first sub CPU 201 sets the SATA registers of the second SATA port control unit 206 connected to the SSD 115. The processing proceeds to step S1308. In step S1307, the first sub CPU 201 sets the SATA registers of the first SATA port control unit 204 connected to the HDD 114 side. The processing proceeds to step S1308.

In step S1308, the first sub CPU 201 reads the nth piece of data information from the data table 718 in the descriptor table 719. In step S1309, the first sub CPU 201 sets the source address 710 and the size or byte count 712 included in the nth piece of data information into the DMAC 208. In step S1310, the first sub CPU 201 gives an instruction for command issuance to the storage device determined to be used in step S1305. At the same time, the first sub CPU 201 gives an instruction for activation to the DMAC 208 set in step S1309 to start the nth command transfer. The DMAC 208 transfers write data from the source address 710 on the DRAM (main memory) 104 to the physical LBA of the HDD 114 or the SSD 115 determined to be used in step S1305. In step S1311, the first sub CPU 201 waits for a status issued from the selected storage device. If the status is not received (NO in step S1311), the processing remains in step S1311. If the status is received (YES in step S1311), the processing proceeds to step S1312. In step S1312, the first sub CPU 201 determines the EOF flags 705 and 713 which indicate whether the nth command is the last one. If the EOF flags 705 and 713 are 0 (NO in step S1312), the processing returns to step S1303. In step S1303, the first sub CPU 201 reads the next piece of command information to repeat the processing of steps S1303 to S1311. If the EOF flags 705 and 713 are (YES in step S1312), the processing proceeds to step S1313. In step S1313, the first sub CPU 201 notifies the main CPU 101 that the transfer processing (here, write processing) for all the pages of the target file to the storage device is completed. The processing ends.

Read processing (issuance of Read DMA Ext commands) can be performed through basically the same method as that of the processing in FIG. 13. That is, the data stored in the storage devices can be read by generating a reading descriptor table from the s file management table 610.

Figure 14:
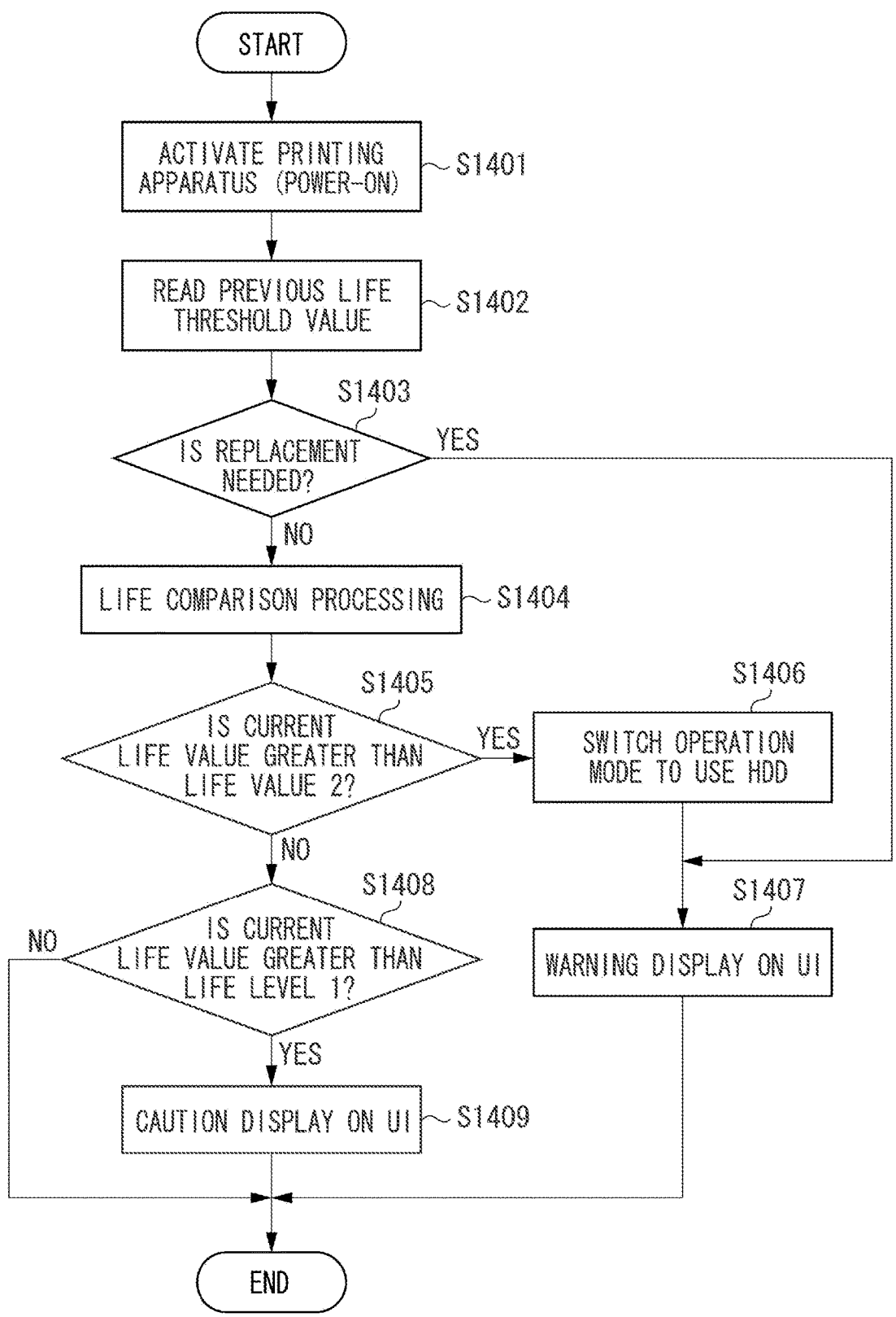
FIG. 14 is a flowchart illustrating a service life determination processing.

FIG. 14 is a flowchart illustrating service life determination processing for the SSD 115. In step S1401, a user activates the printing apparatus by power-on. In step S1402, the main CPU 101 reads the previous service life threshold value 409 from the storage management table 414. In step S1403, the main CPU 101 determines whether replacement is needed, based on the SSD replacement flag 412 registered in the service life threshold value 409. If replacement is needed (YES in step S1403), the processing proceeds to step S1407. If replacement is not needed (NO in step S1403), the processing proceeds to step S1404. In step S1407, the main CPU 101 issues an instruction to display a warning display on the UI of the panel apparatus 118. The service life determination processing ends. For example, the panel apparatus 118 displays a warning message for prompting the replacement of the SSD 115 on a status display area of the UI. In step S1404, the main CPU 101 performs service life comparison processing. The service life comparison processing refers to processing for comparing the current service life value 415 with the service life levels 1 and 2 (410 and 411) as illustrated in FIG. 4. In step S1405, the main CPU 101 determines whether the current service life value 415 is greater than the service life level 2 (411). If the current service life value 415 is greater than the service life level 2 (411) (YES in step S1405), the processing proceeds to step S1406. If the current service life value 415 is smaller than or equal to the service life level 2 (411) (NO in step S1405), the processing proceeds to step S1408.

In step S1406, the main CPU 101 stops the write processing using the SSD 115, and switches an operation mode to use the HDD 114 for all subsequent operations of the write processing. That is, the main CPU 101 assigns another storage device (HDD 114) instead of the SSD 115. In step S1407, the main CPU 101 issues a second notification to the panel apparatus 118 to display a warning display for the replacement of the SSD 115 on the UI of the panel apparatus 118. The service life determination processing ends. In step S1408, the main CPU 101 determines whether the current service life value 415 is greater than the service life level 1 (410). If the current service life value 415 is greater than the service life level 1 (410) (YES in step S1408), the processing proceeds to step S1409. If the current service life value 415 is smaller than or equal to the service life level 1 (410) (NO in step S1408), the service life determination processing ends. The main CPU 101 then starts a normal operation. In step S1409, the main CPU 101 issues a first notification to the panel apparatus 118 to display a caution display for the replacement of the SSD 115 on the UI of the panel apparatus 118. The service life determination processing ends.

As described above, if the data size needed for writing in units of pages during the processing of print data is smaller than or equal to the PM threshold value 408, the main CPU 101 transfers the data to the HDD 114. If the needed data size is greater than the PM threshold value 408, the main CPU 101 transfers the data to the SSD 115. In other words, the use of the SSD 115 is avoided for writing of data that can be handled with the intermediate processing speed of the HDD 114. The SSD 115 is used only for writing of data that needs high processing speed. In such a manner, the service life in terms of the limited number of rewrite cycles, which is a drawback of the SSD 115, can be relatively extended.

Figure 15:
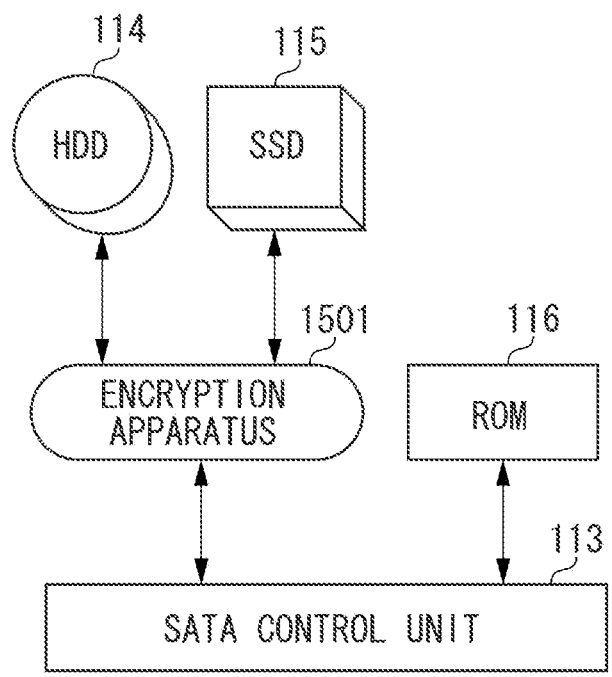
FIG. 15 is a diagram illustrating a configuration example of connection of an encryption apparatus.

A second exemplary embodiment will be described below. FIG. 15 is a diagram illustrating an example of a SATA-SATA bridge configuration in which an encryption apparatus 1501 is connected to the SATA control unit 113. The SATA control unit 113 is connected to a SATA-device side of the encryption apparatus 1501. The HDD 114 and the SSD 115 are connected to a SATA-host side of the encryption apparatus 1501. The encryption apparatus 1501 may be an external apparatus connected by SATA cable(s). The encryption apparatus 1501 may be mounted on the main controller 122 in an on-chip manner. The ROM 116 is connected to the SATA control unit 113.

Figure 16:
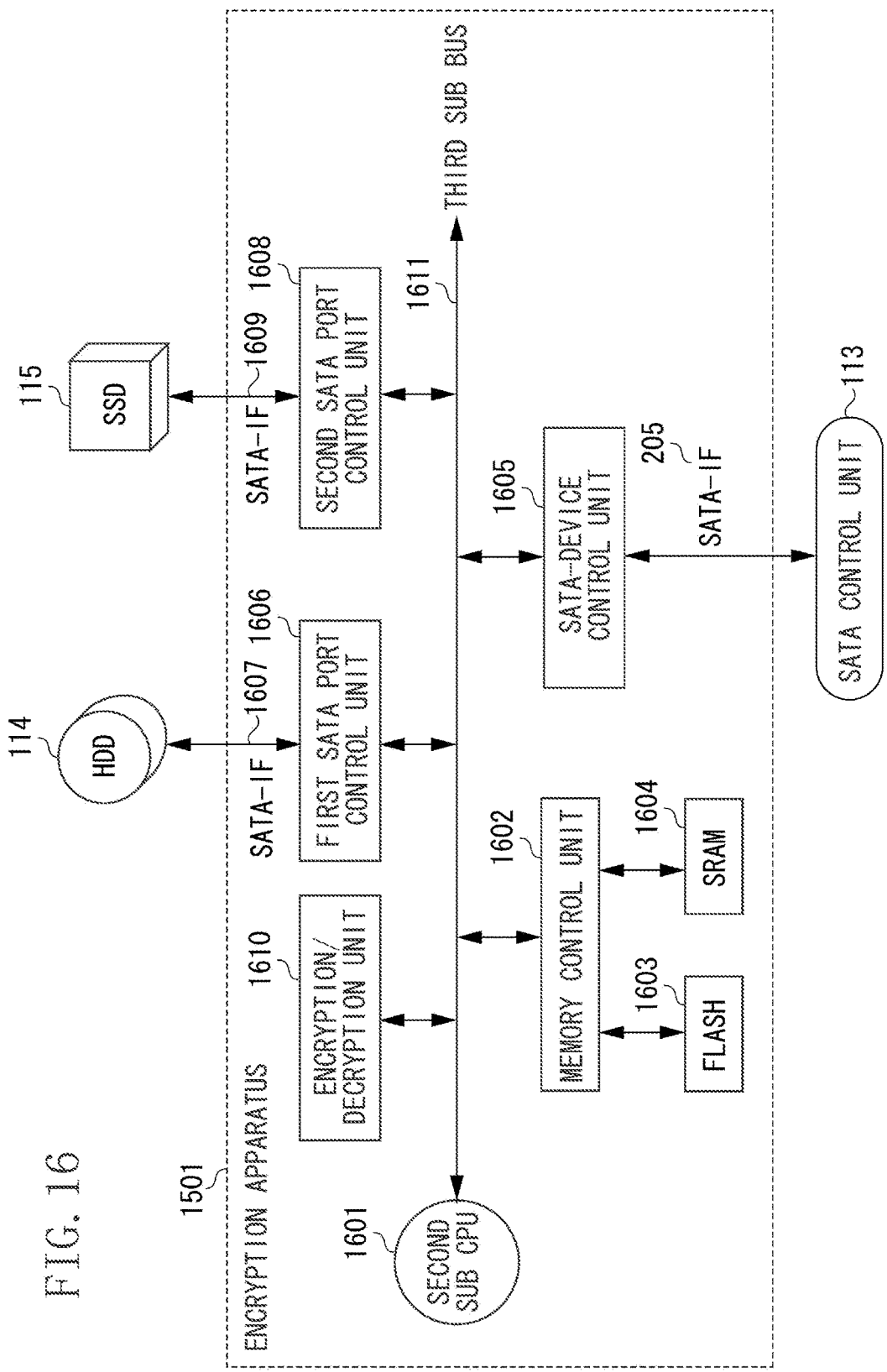
FIG. 16 is a diagram illustrating a configuration example of the encryption apparatus.

FIG. 16 is a diagram illustrating an internal configuration example of the encryption apparatus 1501. A second sub CPU 1601 is a control unit for performing overall control as a SATA controller, including SATA command issue processing, encryption and decryption processing and data transmission processing of transmission/reception data, SATA status reception processing, and various types of calculation processing. A memory control unit 1602 performs controls such as input/output control on a flash memory 1603 and an SRAM 1604, and interrupt processing on the second sub CPU 1601. The flash memory 1603 stores various programs such as an SATA control program and an encryption program, control parameters, and encryption key information. The second sub CPU 1601 boots up from a program of the flash memory 1603 upon activation. The SRAM 1604 is used as a work area of the second sub CPU 1601, a storage area of various control tables and parameters, and a data buffer. The memory control unit 1602 and the SRAM 1604 may each independently control a one-port RAM, a two-port RAM, or an FIFO memory. The memory control unit 1602 and the SRAM 1604 may include a plurality of such memories. A SATA-device control unit 1605 is connected to the SATA control unit 113 by the SATA-IF 205, and performs communication control for command reception and status transmission of the SATA standard. A first SATA port control unit 1606 and a second SATA port control unit 1608 include the SATA link layer and physical layer. The first SATA port control unit 1606 and the second SATA port control unit 1608 control the HDD 114 and the SSD 115 according to settings of various SATA registers made by the second sub CPU 1601. The first SATA port control unit 1606 and the second SATA port control unit 1608 issue physical (electrical signal) commands and receive statuses of the SATA standard to/from the HDD 114 and the SSD 115 connected to SATA-IFs 1607 and 1609. The first SATA port control unit 1606 is connected with the HDD 114. The second SATA port control unit 1608 is connected with the SSD 115. An encryption/decryption unit 1610 is a module for encrypting or decrypting reception data. A third sub bus 1611 includes a bus controller, a control bus, a data bus, and a local bus between arbitrary blocks. The HDD 114 is connected to the main CPU 101 via a plurality of stages of SATA port control units 204 and 1606. The SSD 115 is connected to the main CPU 101 via a plurality of stages of SATA port control units 204 and 1608.

The second sub CPU 1601 interprets commands received from the SATA control unit 113 and controls the encryption/decryption unit 1610 to perform encryption or decryption on the data payload of a required command. The second sub CPU 1601 also receives extended commands originally defined by the user from the SATA control unit 113, aside from SATA standard commands. As will be described below, extended commands are not issued to the storage devices (HDD 114 and SSD 115) and used for control and status acquisition of the encryption apparatus 1501 by the main controller 122.

Figure 17:
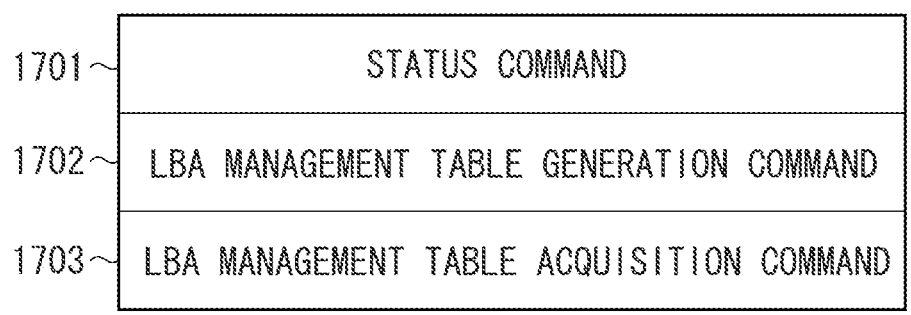
FIG. 17 is a diagram illustrating examples of extended commands for control and status acquisition of the encryption apparatus.

FIG. 17 is a diagram illustrating an example of extended commands. A method for generating the LBA management table 413 in the SATA-SATA bridge configuration will be described with reference to FIG. 17. The main CPU 101 issues an LBA management table generation command 1702, which is an extended command to the encryption apparatus 1501. The second sub CPU 1601 that has received the LBA management table generation command 1702 generates the LBA management table 413. The generation method is similar to that of the generation procedure by the first sub CPU 201 described above with reference to FIG. 10. The second sub CPU 1601 that has completed the generation of the LBA management table 413 enables a completion flag bit arranged in a previously-defined status register. The main CPU 101 regularly issues a status command 1701, an extended command, to the encryption apparatus 1501 to obtain status register information. If the completion flag bit of the obtained status register information is enabled, the main CPU 101 further issues an LBA management table acquisition command 1703, which is an extended command. The second sub CPU 1601 that has received the LBA management table acquisition command 1703 includes the generated LBA management table information into a data frame instruction structure (FIS) defined by the SATA standard, and transmits the data FIS to the SATA control unit 113. The received LBA management table information is stored into a predetermined location previously set on the DRAM (main memory) 104 when the extended command is issued. More specifically, the LBA management table information is registered into an LBA management table storage location in the storage management table area 804 as illustrated in FIG. 8. In such a manner, the LBA management table 413 is shared between the second sub CPU 1601 of the encryption apparatus 1501 and the main CPU 101.

The process for writing a file (for N pages) received by the main controller 122 into the storage devices (HDD 114 and SSD 115) is basically similar to that described above with reference to FIGS. 11 to 13 according to the first exemplary embodiment. The conversion of a logical LBA into a physical LBA in step S1304 when the first sub CPU 201 issues a command by using the descriptor table 719, described in FIG. 13, is not performed. More specifically, the address of the command issued from the SATA control unit 113 to the encryption apparatus 1501 remains a logical LBA. In the SATA-SATA bridge configuration, the storage devices (HDD 114 and SSD 115) are actually managed by the encryption apparatus 1501. The processing for converting the logical LBA into a physical LBA is thus performed by the second sub CPU 1601. In the second exemplary embodiment, the processing after a command issued by the SATA control unit 113 according to the descriptor table 719 is received by the encryption apparatus 1501 will be described.

Figure 18:
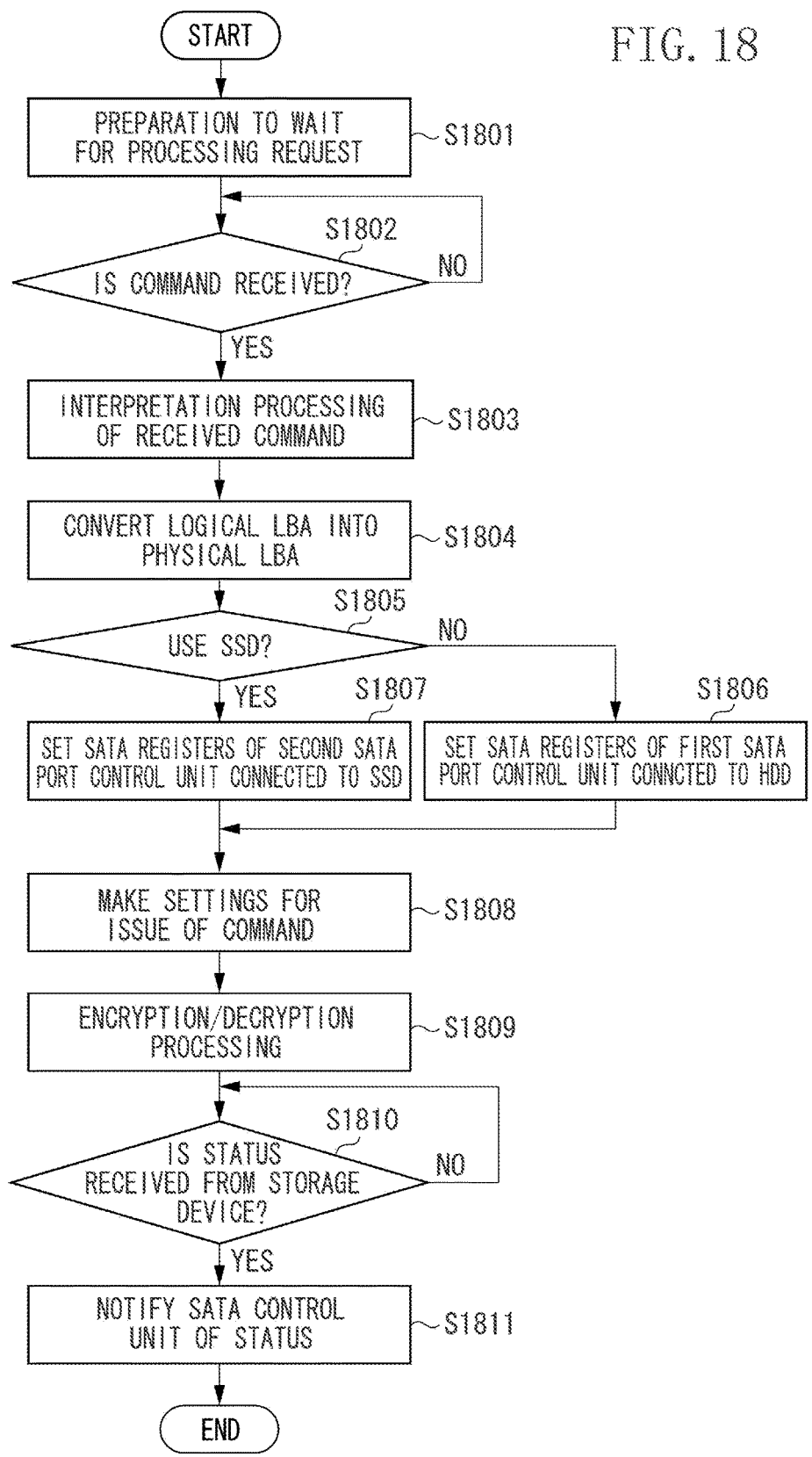
FIG. 18 is a flowchart illustrating command processing of the encryption apparatus.

FIG. 18 is a flowchart illustrating processing in which the encryption apparatus 1501 processes a reception command issued from the SATA control unit 113 according to the descriptor table 719. In step S1801, the second sub CPU 1601 makes preparations to wait for a processing request from an upper host (SATA control unit 113) after the boot processing. More specifically, the second sub CPU 1601 notifies the upper host (SATA control unit 113) of a status indicating a command acceptable state defined by the SATA standard. In step S1802, the second sub CPU 1601 monitors command reception from the upper host (SATA control unit 113). If no command is received (NO in step S1802), the processing remains in step S1802. If reception of a command is detected (YES in step S1802), the processing proceeds to step S1803. In step S1803, the second sub CPU 1601 performs interpretation processing of the received command. In step S1804, the second sub CPU 1601 converts the received logical LBA into a physical LBA according to the LBA management table 413.

In step S1805, the second sub CPU 201 determines which storage device the logical LBA designates, the HDD 114 or the SSD 115. If the HDD 114 is designated (NO in step S1805), the processing proceeds to step S1806. If the SSD 115 is designated (YES in step S1805), the processing proceeds to step S1807. In step S1806, the second sub CPU 1601 sets the SATA registers of the first SATA port control unit 1606 connected to the HDD 114. The processing proceeds to step S1808. In step S1807, the second sub CPU 1601 sets the SATA registers of the second SATA port control unit 1608 connected to the SSD 115. The processing proceeds to step S1808.

In step S1808, the second sub CPU 1601 makes settings for command issuance to the storage device determined in step S1805. In step S1809, the second sub CPU 1601 starts encryption processing (encryption processing because writing is assumed here; for reading, decryption processing) on the reception data from the upper host (SATA control unit 113). The second sub CPU 1601 includes the encrypted data into a data FIS and transmits the data FIS to the lower stage storage device. If the entire data transmission is completed, the processing proceeds to step S1810. In step S1810, the second sub CPU 1601 waits for the reception of a status from the storage device determined to be used in step S1805. If no status is received (NO in step S1810), the processing remains in step S1810. If a status is received (YES in step S1810), the processing proceeds to step S1811. In step S1811, the second sub CPU 1601 notifies the upper host, i.e., the SATA control unit 113 of the status. The processing of one command ends.

According to the present exemplary embodiment, the number of times of rewriting can be reduced to relatively extend the service life of the not-selected nonvolatile storage device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-042307, filed Mar. 4, 2016, which is hereby incorporated by reference herein in its entirety.

What is claimed is:

1. An image forming apparatus for processing print data, comprising:
   a control unit configured to control a plurality of nonvolatile storage devices having different transfer rates; and
   a determination unit configured to determine a nonvolatile storage device to store print data from among the plurality of nonvolatile storage devices based on information related to a size of the print data, information related to the transfer rates of the plurality of nonvolatile storage devices, and a threshold value depending on the number of sheets to be printed and output per unit time,
   wherein the control unit and the determination unit are implemented by at least one processor.

2. The image forming apparatus according to claim 1, wherein the determination unit is configured to, in a case where the size of the print data is smaller than or equal to a predetermined size, determine a nonvolatile storage device having longer service life in terms of a remaining writing capacity to be a storage destination of the print data, among the plurality of nonvolatile storage devices.

3. The image forming apparatus according to claim 1, wherein the determination unit is configured to make the determination based on a sheet size of the print data.

4. The image forming apparatus according to claim 1, further comprising a compression processing unit that compresses the print data to generate compressed print data,
   wherein the compression processing unit is implemented by the at least one processor, and
   wherein the determination unit is configured to make the determination based on a size of the print data per page of the compressed print data.

5. The image forming apparatus according to claim 1, further comprising a threshold value storage unit configured to control storing a threshold value representing a boundary between write speeds of the plurality of nonvolatile storage devices,
   wherein the threshold value storage unit is implemented by the at least one processor.

6. The image forming apparatus according to claim 1, wherein the threshold value is a data size per page corresponding to a write speed, and
   wherein the determination unit is configured to compare a size of write data on each page with the threshold value to make the determination page by page.

7. The image forming apparatus according to claim 1, wherein the control unit is configured to convert a logical address of each of the plurality of nonvolatile storage devices into a physical address, and transfer write data to the physical address.

8. The image forming apparatus according to claim 7, wherein the control unit is configured to specify a nonvolatile storage device among the plurality of nonvolatile storage devices based on the logical address.

9. The image forming apparatus according to claim 1, further comprising a compression processing unit that compresses data to generate compressed data, wherein the compression processing unit is implemented by the at least one processor, and wherein the control unit is configured to transfer, as write data, the compressed data to the determined nonvolatile storage device.

10. The image forming apparatus according to claim 1, wherein the control unit is configured to, in a case where a cumulative write amount of one of the plurality of nonvolatile storage devices is greater than a threshold value, issue a notification.

11. The image forming apparatus according to claim 1, wherein the control unit is configured to, in a case where a cumulative write amount of one of the plurality of nonvolatile storage devices is greater than a first threshold value, issue a first notification, and if the cumulative write amount is greater than a second threshold value, issue a second notification.

12. The image forming apparatus according to claim 1, wherein the control unit is configured to, in a case where a cumulative write amount of one of the plurality of nonvolatile storage devices is greater than a threshold value, assign another one of the nonvolatile storage devices instead of the one nonvolatile storage device.

13. A method performed by a processor configured to control an image forming apparatus for processing print data, the method comprising:

controlling a plurality of nonvolatile storage devices having different transfer rates; and determining a nonvolatile storage device to store print data from among the plurality of nonvolatile storage devices based on information related to a size of the print data, information related to the transfer rates of the plurality of nonvolatile storage devices, and a threshold value depending on the number of sheets to be printed and output per unit time.

* * * * *